US008899104B2

(12) United States Patent
Ulicny et al.

(10) Patent No.: US 8,899,104 B2
(45) Date of Patent: Dec. 2, 2014

(54) TIRE AND METHOD OF SELECTIVELY ALTERING OR CONTROLLING PROPERTIES OR CHARACTERISTICS THEREOF UNDER VARYING CONDITIONS

(75) Inventors: John C. Ulicny, Oxford, MI (US); William R. Rodgers, Bloomfield Township, MI (US); Tadeusz B. Pietrzyk, Sterling Heights, MI (US); Keith S. Snavely, Sterling Heights, MI (US); Mark A. Golden, Washington, MI (US); Jonathan Darab, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1405 days.

(21) Appl. No.: 12/547,538

(22) Filed: Aug. 26, 2009

(65) Prior Publication Data

US 2010/0077848 A1 Apr. 1, 2010

Related U.S. Application Data

(60) Provisional application No. 61/100,868, filed on Sep. 29, 2008.

(51) Int. Cl.

| | |
|---|---|
| ***G01M 17/02*** | (2006.01) |
| ***B60C 5/14*** | (2006.01) |
| ***B60C 19/00*** | (2006.01) |
| ***B29D 30/72*** | (2006.01) |
| ***B60C 9/02*** | (2006.01) |
| *B29D 30/00* | (2006.01) |
| *H01F 1/44* | (2006.01) |

(52) U.S. Cl.
CPC ............... *G01M 17/024* (2013.01); *B60C 5/14* (2013.01); *B60C 19/00* (2013.01); *B29D 30/72* (2013.01); *B29D 2030/724* (2013.01); *B60C 9/02* (2013.01); *B60C 2019/005* (2013.01); *B29D 2030/0077* (2013.01); *B60C 2019/004* (2013.01); *B29D 30/0061* (2013.01); *B29D 2030/722* (2013.01); *B29D 2030/0088* (2013.01); *H01F 1/447* (2013.01)
USPC ............................................................ 73/146

(58) Field of Classification Search
USPC ................................................ 73/146–146.8
See application file for complete search history.

(56) References Cited

U.S. PATENT DOCUMENTS 6,659,148 B1 12/2003 Alie
6,842,671 B2 1/2005 Tropper (Continued)

OTHER PUBLICATIONS

Von Lockett, Paris R.; Kadlowec, Jennifer; Koo, Jeong-Hoi; Particles in Magnetorheological Elastomers. Proc. of SPIE, vol. 6170, 61700T (2006).

(Continued)

*Primary Examiner* — Andre Allen
(74) *Attorney, Agent, or Firm* — BrooksGroup

(57) ABSTRACT

One exemplary embodiment includes a method comprising providing a tire having a component constructed and arranged to cause at least one portion of the tire to have a first stiffness or resistance to force exerted thereon under a first condition and a second stiffness or resistance to force exerted thereon under a second condition and selectively causing the first or second condition to occur.

15 Claims, 7 Drawing Sheets

(56) References Cited

U.S. PATENT DOCUMENTS

| | | | | |
|---|---|---|---|---|
| 2009/0229358 | A1* | 9/2009 | Jongsma et al. | 73/146 |
| 2009/0314404 | A1* | 12/2009 | Rodgers et al. | 152/209.5 |
| 2009/0314406 | A1* | 12/2009 | Browne et al. | 152/503 |
| 2009/0315696 | A1* | 12/2009 | Browne et al. | 340/442 |
| 2010/0300191 | A1* | 12/2010 | Jongsma et al. | 73/146 |
| 2010/0314015 | A1* | 12/2010 | Rodenbeck | 152/418 |
| 2011/0024010 | A1* | 2/2011 | Browne et al. | 152/209.5 |
| 2013/0240272 | A1* | 9/2013 | Gass et al. | 180/54.1 |

OTHER PUBLICATIONS

Fuchs, A.; Zhang, Q.; Elkins, J.; Gordaninejad, F.; Evrensel, C. Development and Characterization of Magnetorheological Elastomers. Journal of Applied Polymer Science vol. 105, issue 5, pp. 2497-2508 (2007).

Stepanov, G.; Abramchuk, S.; Grishin, D.; Nikitin, L.; Kramarenko, E.; Khokhlov, A. Effect of a Homogeneous Magnetic Field on the Viscoelastic Behavior of Magnetics Elastomers. Polymers 48, pp. 488-495 (2007).

* cited by examiner

TIRE AND METHOD OF SELECTIVELY ALTERING OR CONTROLLING PROPERTIES OR CHARACTERISTICS THEREOF UNDER VARYING CONDITIONS

CROSS REFERENCE TO RELATED APPLICATIONS

This application claims the benefit of U.S. Provisional Application Ser. No. 61/100,868 filed Sep. 29, 2008.

TECHNICAL FIELD

The field to which the disclosure generally relates includes tires, and methods of making and using the same and methods of using products including the same.

BACKGROUND

The performance of a tire may vary under different operating conditions.

SUMMARY OF EXEMPLARY EMBODIMENTS OF THE INVENTION

One exemplary embodiment includes a method comprising providing a tire having a component constructed and arranged to cause at least one portion of the tire to have a first stiffness or resistance to force exerted thereon under a first condition and a second stiffness or resistance to force exerted thereon under a second condition and selectively causing the first or second condition to occur.

In another exemplary embodiment of the invention, the first or second condition is passively or actively caused to occur.

One exemplary embodiment of the invention includes a method of dynamically controlling the handling properties of a vehicle tire comprising determining if a condition of the driving environment or a condition of the vehicle or a condition of a vehicle component has occurred or has occurred within a specific timeframe, and if the condition is occurring or has occurred within the specific timeframe, taking action. The action may include changing the handling properties of the vehicle tire comprising actively changing the stiffness or resistance to force exerted thereon at one or more selective locations of the tire.

Another exemplary embodiment may include a method of controlling the properties of a vehicle tire comprising changing the properties of a vehicle tire comprising using a fluid to change the stiffness or resistance to a force exerted on the tire at one or more selected locations of the tire as the tire is rotating during operation of the vehicle.

Another exemplary embodiment of the invention may include a method comprising providing a tire comprising a first material which is the bulk of the volume of the tire and a plurality of magnetizable particles or fibers in the first material, and selectively applying a magnetic field to the particles or fibers in the first material to change the stiffness of the tire or the resistance of the tire to a force exerted thereon at least one location of the tire.

Another exemplary embodiment of the invention may include a tire comprising a first material and a component constructed and arranged to actively or passively change the stiffness of selected portions of the tire upon occurrence of at least one condition comprising at least one of a determined driving condition of the vehicle, determined operating condition of the vehicle, determined condition of a vehicle component, wherein the tire is being mounted to a rim or being dismounted from a rim or upon vehicle driver input.

Another exemplary embodiment includes a method of making a tire comprising incorporating magnetizable particles into at least one of an elastomer or rubber material, a ply material, an inner liner material, a carcass structure material, an overlay material, an bead apex filler material, a bead material or a flipper material for making a tire, and thereafter curing the material to provide a final cross-linked tire material.

Another exemplary embodiment of the invention may further include applying a magnetic field to the particles in the material prior to the curing of the material to provide the final cross-linked tire material.

In another embodiment, no magnetic field may be utilized prior to the curing of the material to provide the final cross-linked material.

Another illustrative embodiment may include an assembly comprising a tire mounted to a rim, the tire comprising an elastomer or rubber material which is the bulk of the volume of the material, and a plurality of magnetizable particles incorporated in the material and a magnetic coil constructed and arranged to selectively apply a magnetic field to the particles to selectively stiffen the material or increase the resistance of the material to a force applied thereto at least one location of the tire.

Another exemplary embodiment of the invention includes an assembly comprising a tire and at least one chamber or bladder for selectively receiving a fluid to increase the stiffness of the tire at the location of the chamber or bladder when fluid is received in the chamber or bladder.

Another exemplary embodiment includes an assembly further including a fluid delivery system for moving fluid in and out of the chamber or bladder.

Another exemplary embodiment may include an assembly wherein the stiffness of the tire may be varied by varying the amount of fluid in the chamber or bladder, or by varying the pressure exerted by the fluid on the tire at the location of the chamber or bladder.

Another exemplary embodiment includes an assembly further including a fluid pressure source.

Another embodiment of the invention includes a wheel and hub for a tire and a fluid pressurizing device in the hub.

Another exemplary embodiment includes a tire including at least one chamber or bladder and a fluid in the chamber or bladder.

Another exemplary embodiment includes a tire having at least one chamber or bladder and including a fluid in the chamber or bladder, wherein the fluid is a magnetorheological fluid and further including a device for applying a magnetic force or field across the magnetorheological fluid in the bladder.

Another exemplary embodiment includes a tire having at least one chamber or bladder and a fluid in the chamber or bladder, and a heating element constructed and arranged to heat the fluid to increase the pressure in the bladder to thereby increase the stiffness or resistance to an applied force at the location of the fluid.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Exemplary embodiments may include systems and methods for controlling characteristics of a vehicle tire. Another exemplary embodiment may include a tire having a controllable characteristic.

In various exemplary embodiments, components may be added to a vehicle tire to alter or dynamically modulate the stiffness characteristics of either the tread or the sidewall, or both, of the vehicle tire. In one exemplary embodiment, magnetizable particles, for example, such as micron-sized iron particles used in magnetorheological fluids, may be directly incorporated into a component of the vehicle tire, such as the elastomer or rubber material which comprises the bulk volume of the tire. In other embodiments, the magnetizable particles may be incorporated into an overlay, a ply, a liner, or in the apex formed near the toe guard of the tire as will be described hereafter.

In other exemplary embodiments, fluid chambers or fluid bladders may be provided along an inner wall of the tire into which a gas, a liquid or a controllable fluid such as a magnetorheological fluid may be delivered by way of pumps or the like. In one embodiment, the fluid bladders may be activated by either pneumatic, hydraulic pressure, or by electrical power means. The individual bladders may be activated or deactivated to vary the stiffness across the face of the tread or wall of the tire to provide desirable handling characteristics in various driving conditions.

Figure 1:
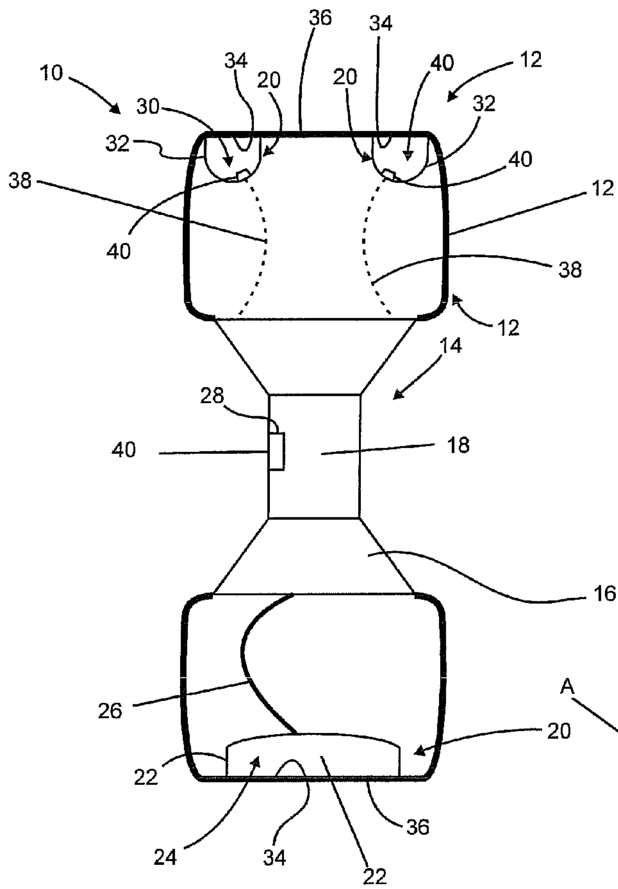
FIG. 1 is a schematic illustration of an active tire according to one exemplary embodiment of the invention.

Referring to FIG. 1, one exemplary embodiment of the invention includes a product 10 including a tire 12 which may be mounted to a wheel 14 including a wheel hub 18 and a wheel rim 16. In a select embodiment, the wheel hub 18 and rim 16 may be made of a metal, alloy or non-magnetizable material. The tire 12 may include a component 20 constructed and arranged to cause at least one portion of the tire 12 to have a first stiffness or resistance to force exerted thereon under a first condition and a second stiffness or resistance to force exerted thereon under a second condition. The tire 12 including the component 20 may be operated to selectively cause the first or second condition to occur.

In one exemplary embodiment, the component 20 may include a bladder 22 having a bladder cavity 24 defined therein for receiving a fluid in the form of a liquid or a gas. A fluid conduit 26 may be provided to flow fluid in or out of the bladder 22. A fluid delivery system 28 may be provided and may include, but is not limited to, a pump and/or controls for operating the same. The fluid delivery system 28 may be provided in the wheel hub 18, rim 16 or other portion of a vehicle to which the tire 12 and wheel 14 are mounted. Suitable fluids for use in the bladder 22 include, but are not limited to, magnetorheological fluids, antifreeze, coolant, brake fluid, transmission fluid, mineral oil or synthetic oils or the like, or a liquid that is easily converted to a gas with the application of heat, and suitable gases include, but are not limited to, air, nitrogen, or an inert gas.

In another exemplary embodiment, a chamber housing material 32 defines, at least in part, a chamber 30 including a fluid. A fluid may be provided in the chamber 30 including, but not limited to, magnetorheological fluids, antifreeze, coolant, brake fluid, transmission fluid, mineral oil or synthetic oils or the like or a liquid which may be converted to a gas with the application of heat, air, nitrogen, or inert gas. In one exemplary embodiment, an electrical power lead 38 may be provided and connected to a component 40 and constructed and arranged to heat the fluid in the chamber 30 or to provide an electrical potential across the fluid in the chamber 30. In one exemplary embodiment, the component 40 is a heater, for example, having a resistive heating element. The heating element 40 may be received in the chamber 30 or in another location, including, but not limited to, the chamber housing material 32 which defines, at least in part, the chamber 30.

One embodiment of the invention may include a method comprising providing a tire comprising a plurality of magnetizable particles or fibers in a first material, and selectively applying a magnetic field to the particles or fibers in the first material to change the stiffness of the tire or the resistance of the tire to a force exerted thereon at least one location of the tire.

Figure 2:
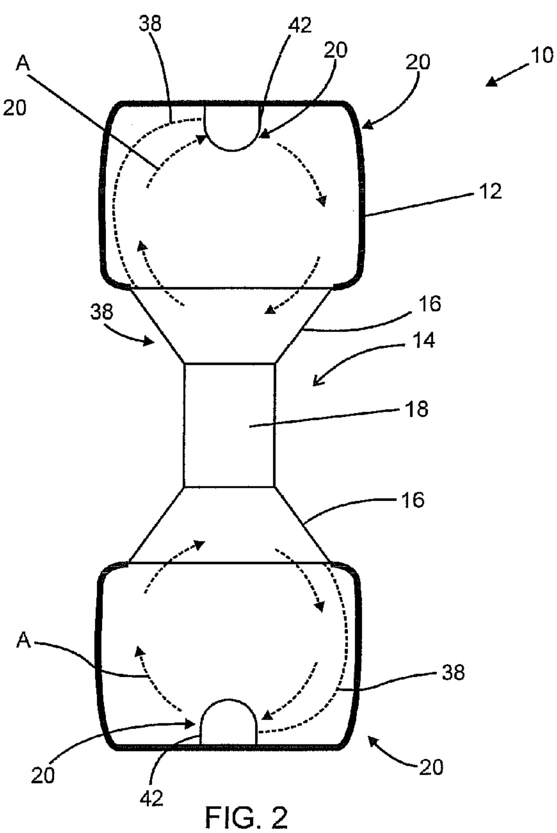
FIG. 2 is a schematic illustration of a magnetorheological elastomer tire according to one exemplary embodiment of the invention.

Referring now to FIG. 2, another exemplary embodiment includes a product 10 including a tire 12 which may be mounted to a wheel 14 including a non-magnetizable wheel hub 18 and a surrounding rim 16 which may be made from a magnetizable material. A component 20 may be provided in the tire to create a magnetic field or force producing a magnetic field, for example as illustrated by lines A. The tire 12 may include magnetizable particles or fibers in any one of a variety of layers as will be described hereafter. In one embodiment, the component 20 may be coil 42. Electric power lead 38 may be connected to the coil 42 so that the coil 42 may produce the magnetic field.

Suitable magnetizable particles or fibers may include, but are not limited to, paramagnetic, superparamagnetic, ferromagnetic compounds, or a combination comprising at least one of the foregoing compounds. Examples of specific magnetizable materials include iron, iron oxide, iron nitride, iron carbide, carbonyl iron, chromium dioxide, low carbon steel, silicon steel, nickel, cobalt, or the like, or a combination comprising at least one of the foregoing. The iron oxide includes all forms of pure iron oxide, such as, for example, $Fe_2O_4$ and $Fe_3O_4$, as well as those containing small amounts of other elements, such as, manganese, zinc or barium. Specific examples of iron oxide include ferrites and magnetites. In addition, the magnetizable particles can be comprised of alloys of iron, such as, for example, those containing aluminum, silicon, cobalt, nickel, vanadium, molybdenum, chromium, tungsten, manganese, copper, or a combination comprising at least one of the foregoing metals.

In one embodiment, the magnetizable particle may be included in one of the layers of the tire, including but not limited to the body portion 60 (in FIG. 3), and a magnetic field may be applied to the particles in the material prior to the curing of the material to provide the final cross-linked tire material. In another embodiment, no magnetic field may be utilized prior to the curing of the material to provide the final cross-linked material.

Figure 3:
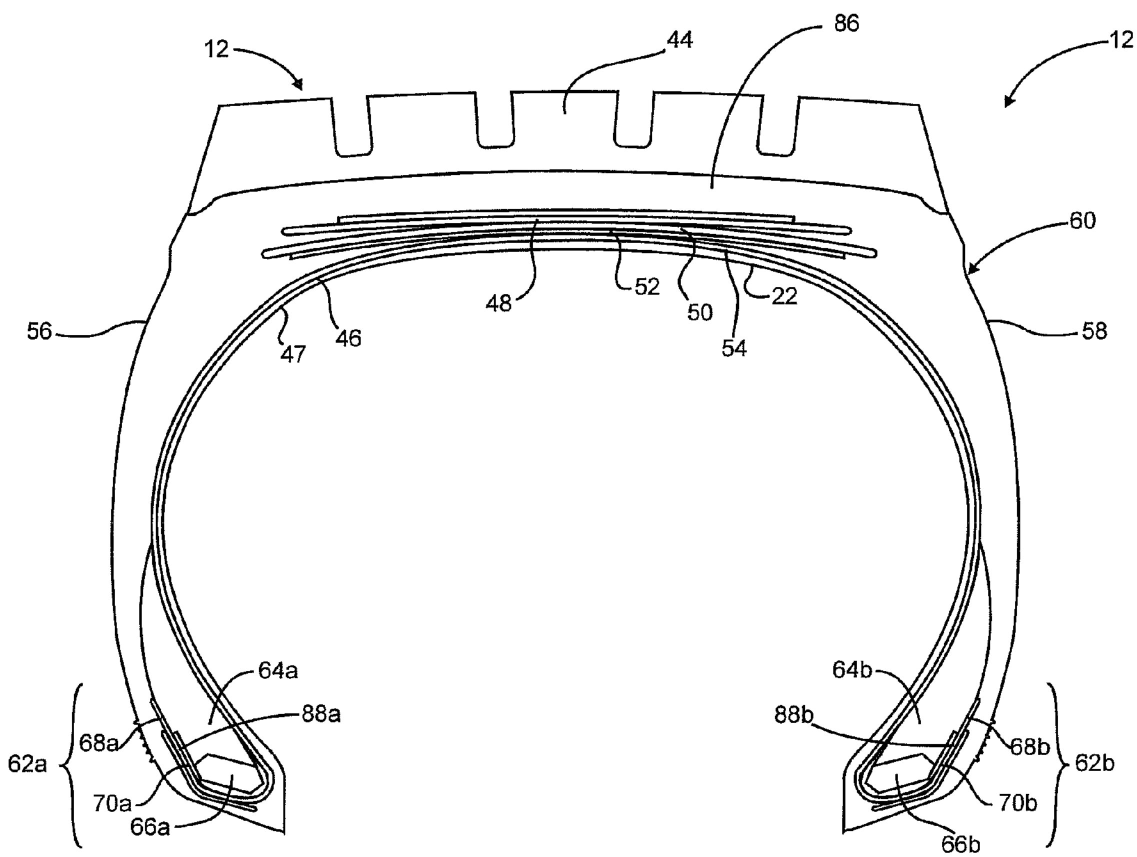
FIG. 3 is a sectional view of a tire according to one embodiment of the invention.

Referring now to FIG. 3, a cross-sectional view of a tire 12 according to one embodiment of the invention in shown and may include a tread 44, one or more carcass ply layers 46, inner liner 47, a belt structure 48 which may include belts 50, 52, a carcass structure 54, a body portion 60 which may be an elastomer or rubber material including two side walls 56, 58, and a tread wall 86, bead regions 62*a*, 62*b* which may include bead filler apexes 64*a*, 64*b* and beads 66*a*, 66*b*. The tire 12 is constructed and arranged to be mounted on a wheel 14 of a vehicle. The carcass ply 46 may include a pair of axially opposite end portions 68*a*, 68*b*, each of which may be secured to a respective one of the beads 66*a*, 66*b*. Each axial end portion 68*a*, 68*b* of the carcass ply 46 may be turned up and around the respective beads 66*a*, 66*b* to a position sufficient to anchor each axial end portion 68*a*, 68*b*. Flippers 88*a*, 88*b* may be respectively provided in the bead regions 62*a*, 62*b* and the carcass ply 46 may engage the axial outer surfaces of the flippers 88*a*, 88*b*.

In one embodiment, a chamber or bladder with a fluid, or magnetizable particles may be utilized to actively change the stiffness of selected portions of the tire upon occurrence of at least one condition comprising at least one of a determined driving condition of the vehicle, determined operating condition of the vehicle, determined condition of a vehicle component, wherein the tire is being mounted to a rim or being dismounted from a rim or upon vehicle driver input.

Figure 4:
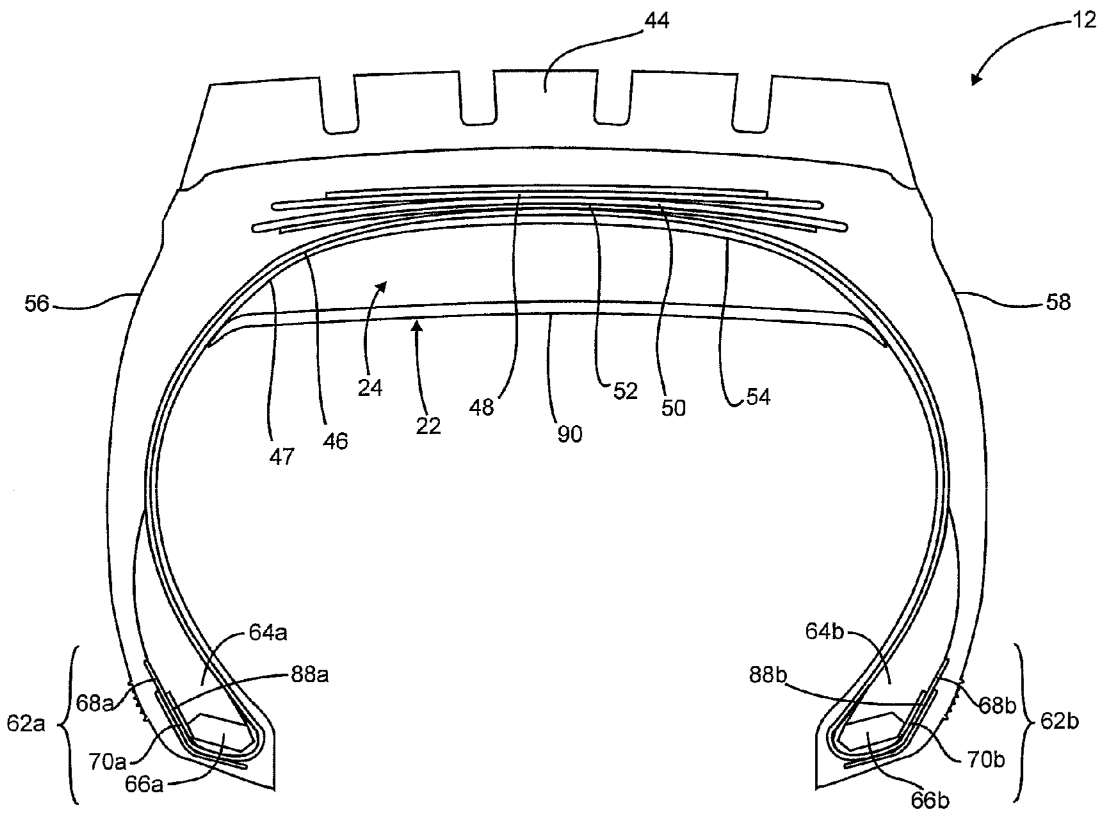
FIG. 4 is a sectional view of a tire according to another embodiment of the invention.

Referring now to FIG. 4, another exemplary embodiment may include a fluid bladder 22 which may be formed by providing a flap 90 adhered to the inner liner 47 in a manner to provide a bladder cavity 24 for receiving a fluid therein.

Figure 5:
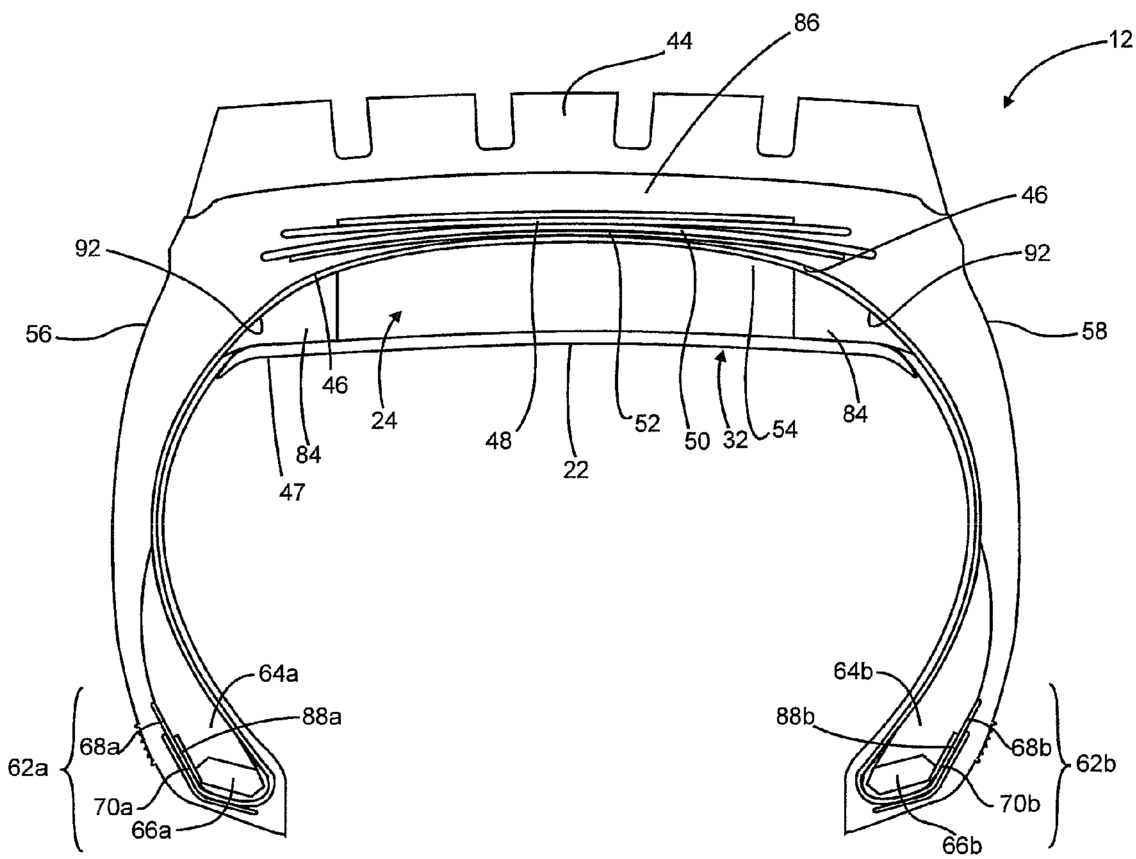
FIG. 5 is a sectional view of a tire according to another embodiment of the invention.

Referring now to FIG. 5, another exemplary embodiment of the invention includes a tire 12 including a fluid bladder 22 or chamber housing constructed and arranged to provide a bladder cavity 24 or chamber respectively between two layers the tire 12. For example, in one embodiment, at least one insert 84 may be provided between layers of the tire, such as, but not limited to, the inner liner 47 and the carcass ply 46. The insert 84 may be constructed and arranged to have a through hole formed therein to provide the bladder cavity 24 or chamber 30. In one embodiment, the insert 84 may have tapered edges 92.

Figure 6:
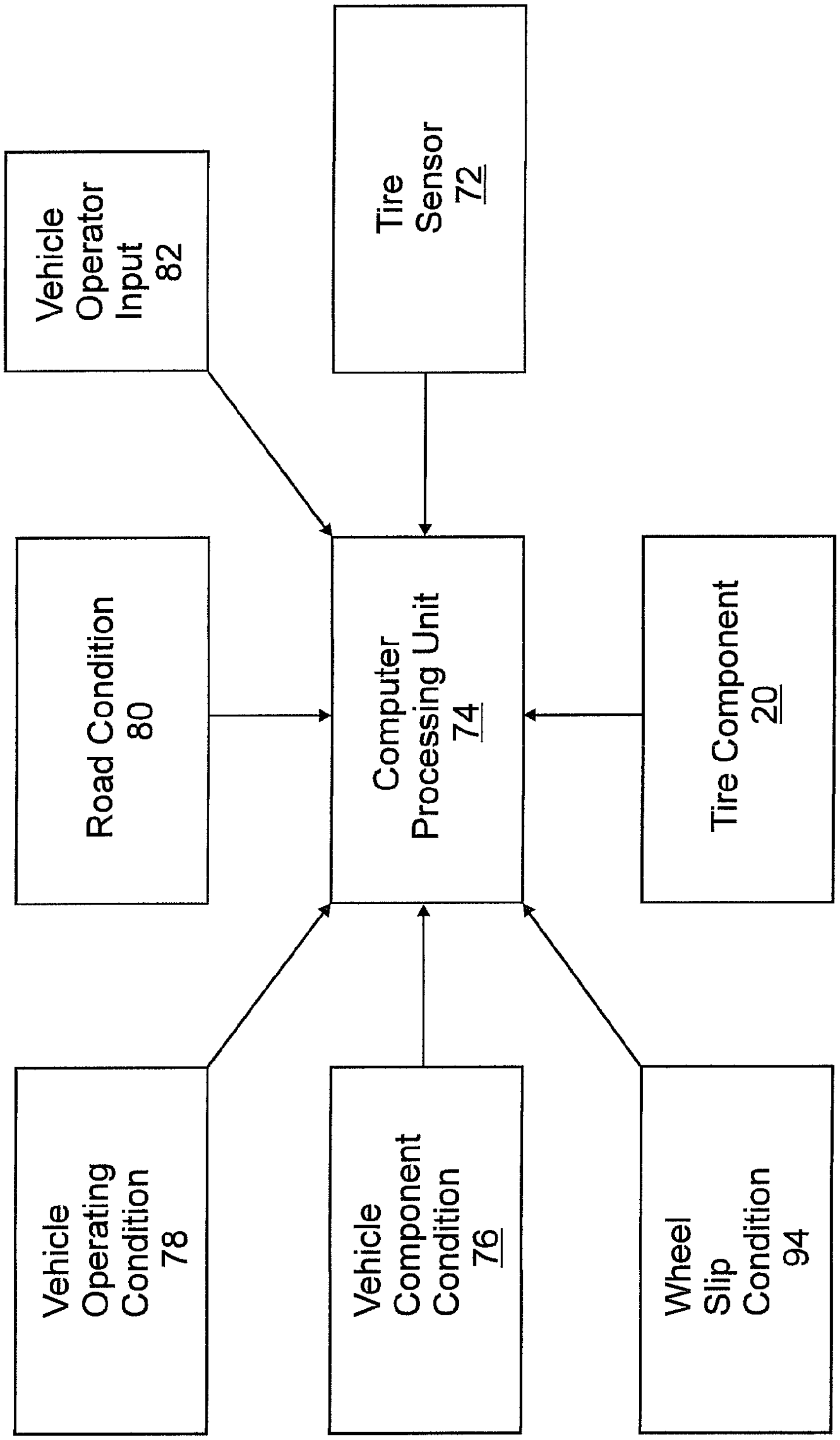
FIG. 6 is a schematic illustration of a system for controlling a tire.

Referring now to FIG. 6, the tire 12 including a component 24 may be controlled by a computer processing unit 74 which may receive input from a variety of sources including, but not limited to, sensors and other signals which indicate, are indicative, or approximate a condition, such as, but not limited to, a tire sensor 72, vehicle component condition 76, vehicle operating condition 78, road condition 80, vehicle operator input 82, wheel slip condition 94, or tire component 20. The computer processing unit may be utilized to actively cause a condition to occur by sending signals, actuating the fluid delivery system 28, sending current through the electrical power lead 38, heat component 40, or energizing coil 42 to cause at least a portion of the tire to have a first stiffness or resistance to force asserted thereon under a first condition and a second stiffness or resistance to force asserted thereon upon a second condition.

One embodiment of the invention may include a method of dynamically controlling the handling properties of a vehicle tire comprising determining if a condition of the driving environment or a condition of the vehicle or a condition of a vehicle component has occurred or has occurred within a specific timeframe, and if the condition is occurring or has occurred within the specific timeframe, taking action. For example, the vehicle operation may be monitored to determine whether the vehicle is operating above a certain speed, or whether the steering wheel angle over a specific time period is relatively constant thereby indicating that the vehicle is traveling at a high rate of speed on a highway. In such case, the stiffness or resistance to force at selected locations of the tire may be increased to minimize tire rolling resistance. However, if the computer processing unit 74 receives input indicative of wet or slippery road conditions, that one or more tires are slipping, that the yaw rate of the vehicle is in a undesirable range, that a vehicle component condition is in an undesirable range, or upon vehicle operator input, the component 20 may be operated to reduce the tire stiffness or resistance to force exerted thereon to thereby increase the tire traction as desired.

Figure 7A:
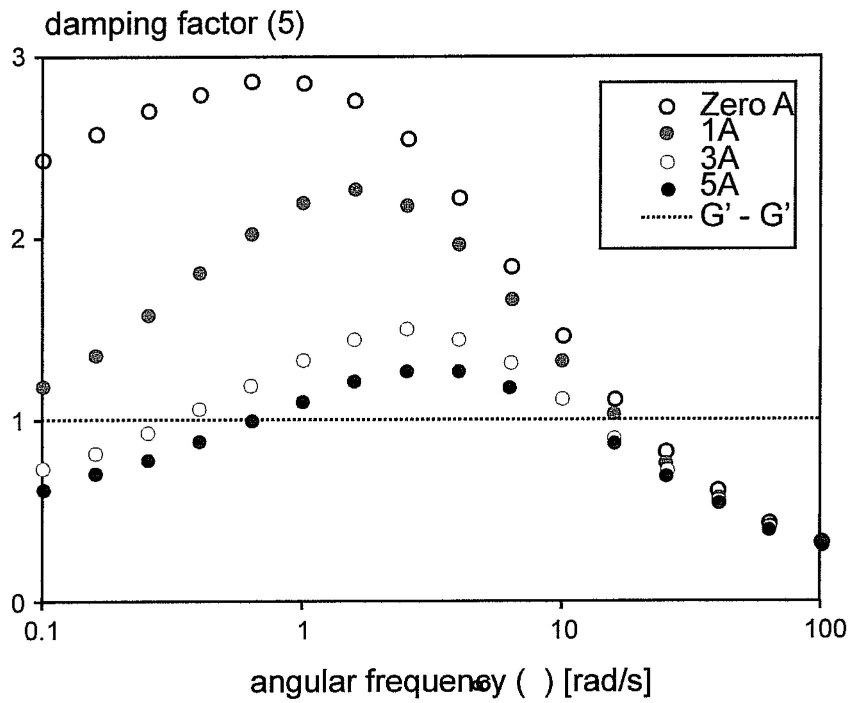
FIG. 7A-B and FIG. 8A-B are graphs illustrating the response of viscoelastic polymer containing various concentrations of magnetizable particles at various levels of magnetic coil current (magnetic field strengths).

FIG. 7A is a graph illustrating the variation in damping factor or tangent delta (ratio of the elastomer loss modulus, G", to the storage modulus, G') with shearing frequency and magnetic coil current for an elastomer containing 5 volume percent magnetizable particles. The data demonstrates that the applied coil current (or resulting magnetic field) can significantly reduce the damping factor and shift the frequency response of the elastomer to higher frequencies effectively making the elastomer stiffer.

Figure 7B:
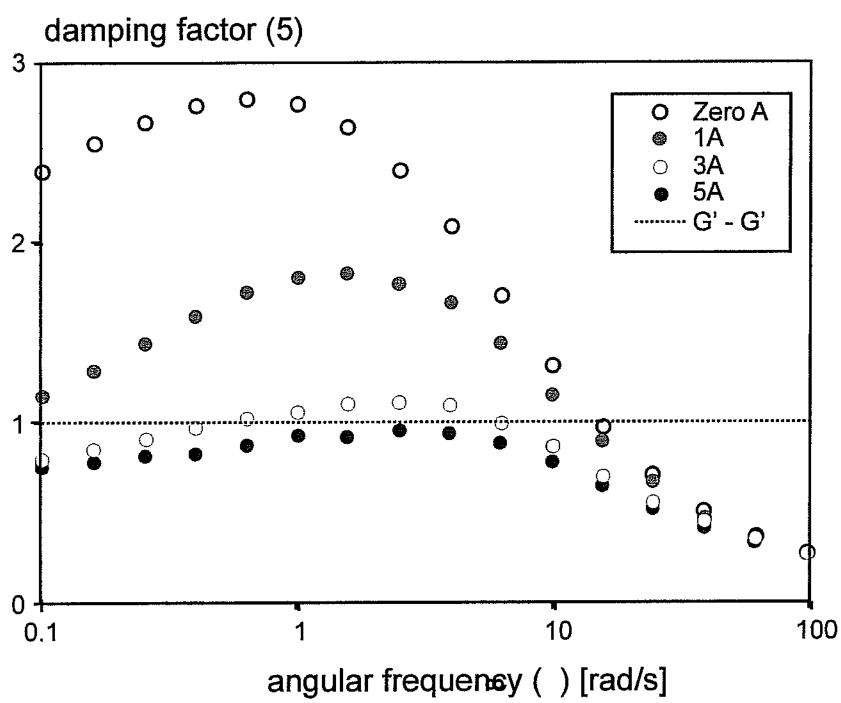

FIG. 7B is a graph illustrating the variation in damping factor with shearing frequency and magnetic coil current for an elastomer containing 10 volume percent magnetizable particles. The data demonstrates that the applied coil magnetic field can significantly reduce the damping factor and shift the frequency response of the elastomer to higher frequencies effectively making the elastomer stiffer.

Figure 8A:
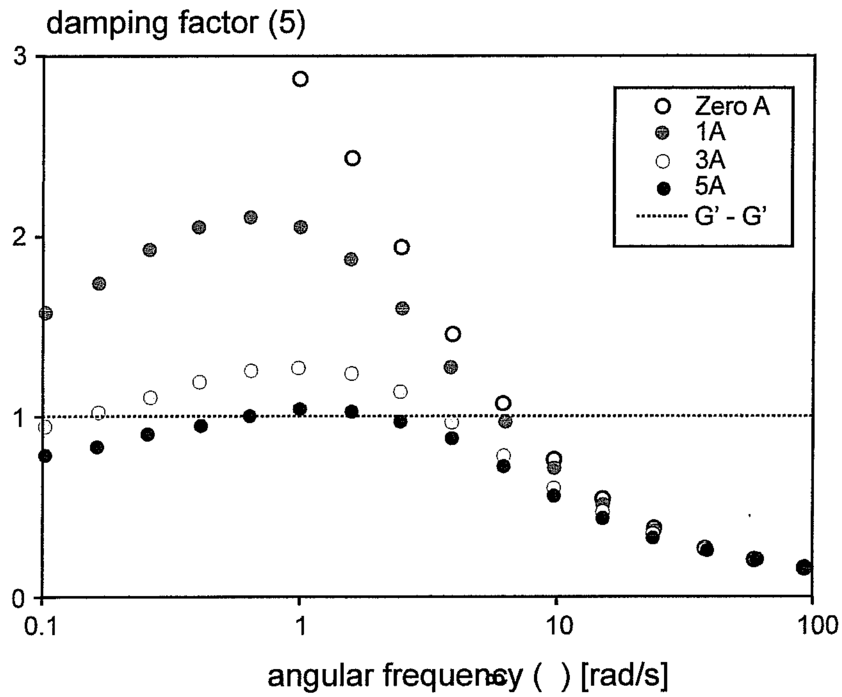

FIG. 8A is a graph illustrating the variation in damping factor with shearing frequency and magnetic coil current for an elastomer containing 15 volume percent magnetizable particles. The data demonstrates that the applied coil magnetic field can significantly reduce the damping factor and shift the frequency response of the elastomer to higher frequencies effectively making the elastomer stiffer.

Figure 8B:
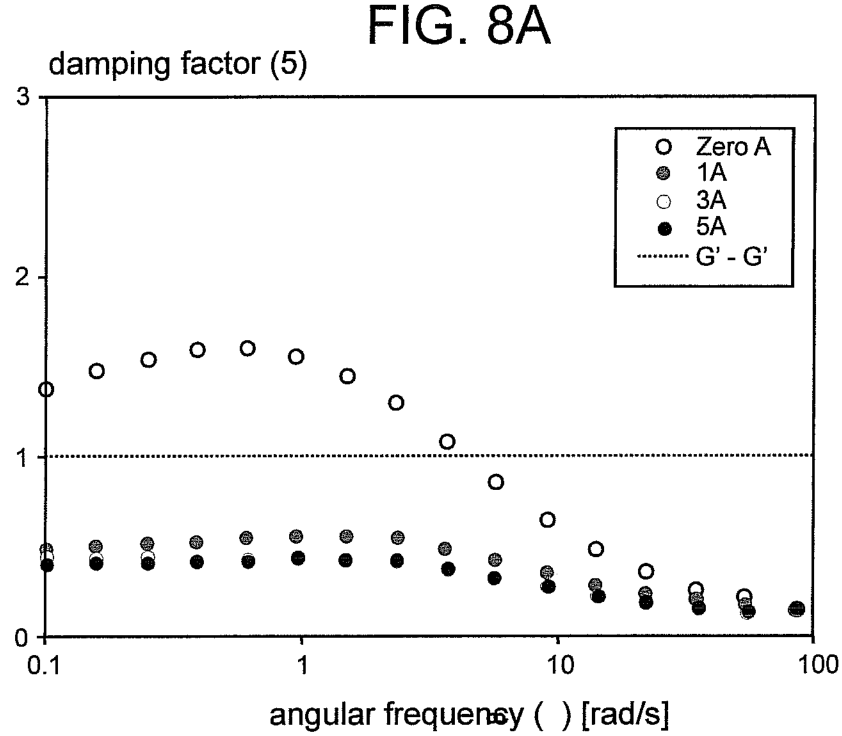

FIG. 8B is a graph illustrating the variation in damping factor with shearing frequency and magnetic coil current for an elastomer containing 20 volume percent magnetizable particles. The data demonstrates that the applied coil magnetic field can significantly reduce the damping factor and shift the frequency response of the elastomer to higher frequencies effectively making the elastomer stiffer.

Together FIGS. 7A-B and 8A-B demonstrate that the stiffness of the elastomer with magnetic particles can be markedly changed and controlled by both the volume concentration of magnetizable particles used and the magnitude of the magnetic field applied. The above description of embodiments of the invention is merely exemplary in nature and, thus, variations thereof are not to be regarded as a departure from the spirit and scope of the invention.

What is claimed is:

1. A method comprising: dynamically controlling the properties of a vehicle tire comprising determining if a condition of the driving environment or a condition of the vehicle or a condition of a vehicle component has occurred or has occurred within a specific timeframe, and if the condition is occurring or has occurred within the specific timeframe changing the properties of the vehicle tire comprising actively changing the stiffness or resistance to force exerted thereon at one or more selective locations of the tire wherein the changing properties of the vehicle tire comprises filling at least one chamber or bladder in an inner wall of the vehicle tire with a fluid to change the stiffness or resistance to a force exerted on the tire at the one or more selected locations of the tire as the tire is rotating during operation of the vehicle.

2. A method as set forth in claim 1 wherein the condition comprises at least one of a determined driving condition of the vehicle, determined operating condition of the vehicle, determined condition of a vehicle component, wherein the tire is being mounted to a rim or being dismounted from a rim or upon vehicle driver input.

3. A method of making a tire comprising incorporating magnetizable particles into at least one of an elastomer or rubber material, a ply material, an inner liner material, a carcass structure material, an overlay material, an bead apex filler material, a bead material or a flipper material for making a tire, and thereafter curing the material to provide a final cross-linked tire material.

4. A method as set forth in claim 3 further include applying a magnetic field to the particles in the material prior to the curing of the material to provide the final cross-linked tire material.

5. A method as set forth in claim 3 wherein a magnetic field is not utilized prior to the curing of the material to provide the final cross-linked material.

6. An assembly comprising a tire and at least one chamber or bladder in an inner wall of the tire for selectively receiving a fluid to increase the stiffness of the tire at the location of the chamber or bladder when fluid is received in the chamber or bladder.

7. An assembly as set forth in claim 6 further including a fluid delivery system for moving fluid in and out of the chamber or bladder.

8. An assembly as set forth in claim 7 wherein the assembly is constructed and arranged so that the stiffness of the tire may be varied by varying the amount of fluid in the chamber or bladder, or by varying the pressure exerted by the fluid on the tire at the location of the chamber or bladder.

9. An assembly as set forth in claim 8 further including a fluid pressure source.

10. A product comprising a wheel and hub for a tire and a fluid pressurizing device in the hub.

11. A product comprising a tire including at least one chamber or bladder in an inner wall of the tire and a fluid in the chamber or bladder.

12. A product as set forth in claim 11 further comprising a fluid in the chamber or bladder, wherein the fluid is a magnetorheological fluid and further including a device for applying a magnetic force or field across the magnetorheological fluid in the bladder.

13. A product as set forth in claim 11 further comprising a heating element constructed and arranged to heat a fluid in the chamber or bladder.

14. A product as set forth in claim 13 wherein the heating element is in the chamber or bladder.

15. An assembly comprising a tire mounted to a rim, the tire comprising an elastomer or rubber material which is the bulk of the volume of the material, and a plurality of magnetizable particles incorporated in the material and a magnetic coil constructed and arranged in the tire to selectively apply a magnetic field to the particles to selectively stiffen the material or increase the resistance of the material to a force applied thereto at at least one location of the tire.

* * * * *